(12) United States Patent
Pasquero et al.

(10) Patent No.: US 9,563,358 B2
(45) Date of Patent: Feb. 7, 2017

(54) ELECTRONIC DEVICE AND METHOD FOR RENDERING SECONDARY CHARACTERS

(71) Applicant: BLACKBERRY LIMITED, Waterloo (CA)

(72) Inventors: Jerome Pasquero, Montreal (CA); Donald Somerset McCulloch McKenzie, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 177 days.

(21) Appl. No.: 14/319,297

(22) Filed: Jun. 30, 2014

(65) Prior Publication Data
US 2015/0378552 A1    Dec. 31, 2015

(51) Int. Cl.
G06F 3/0489    (2013.01)
G06F 3/044     (2006.01)
G06F 3/0488    (2013.01)
G06F 3/023     (2006.01)

(52) U.S. Cl.
CPC .......... *G06F 3/0489* (2013.01); *G06F 3/0236* (2013.01); *G06F 3/044* (2013.01); *G06F 3/0488* (2013.01); *G06F 3/04886* (2013.01); *G06F 3/04895* (2013.01); *G06F 2203/04809* (2013.01)

(58) Field of Classification Search
CPC ................. G06F 3/02; G06F 1/00; G09G 1/00
See application file for complete search history.

(56) References Cited

U.S. PATENT DOCUMENTS

| 2012/0206366 | A1* | 8/2012 | Vandeputte | ........... G06F 3/0236 345/169 |
| 2012/0306747 | A1 | 12/2012 | Davidson et al. | |
| 2014/0035824 | A1* | 2/2014 | Bernstein | ................. G06F 3/02 345/172 |

FOREIGN PATENT DOCUMENTS

| EP | 2079005 | 7/2009 |
| EP | 2570892 | 3/2013 |

OTHER PUBLICATIONS

Extended European Search Report issued in European Application No. 15174141.0 on Nov. 26, 2015.
Communications Pursuant to Article 94(3) EPC issued in European Application No. 15174141.0 on Nov. 9, 2016.

* cited by examiner

*Primary Examiner* — Michael Faragalla
(74) *Attorney, Agent, or Firm* — Fish & Richardson P.C.

(57) ABSTRACT

A portable electronic device is provided. The portable electronic device includes a memory configured to store instructions, and a screen configured to display data. The portable electronic device also includes a keyboard including a plurality of physical keys configured to receive key inputs. Each of the physical keys is associated with inputting a primary character and a secondary character. The portable electronic device further includes a processor configured to execute the instructions to detect an input of a physical key, determine whether the input is a press input or a tap input, the press input being associated with inputting the primary character, and the tap input being associated with inputting the secondary character. The processor is further configured to execute the instructions to enable display on the screen of the secondary character associated with the physical key based on the determination that the input is a tap input.

19 Claims, 12 Drawing Sheets

ELECTRONIC DEVICE AND METHOD FOR RENDERING SECONDARY CHARACTERS

FIELD OF TECHNOLOGY

The present disclosure relates to electronic devices including, but not limited to, portable electronic devices and methods for rendering secondary characters.

BACKGROUND

Electronic devices, including portable electronic devices, have gained widespread use. Portable electronic devices come in many shapes and sizes, such as cellular telephones (mobile phones), smart telephones (smart phones), Personal Digital Assistants (PDAs), tablet computers, or laptop computers, with wireless network communications connectivity, or near-field communications connectivity, such as Bluetooth® capabilities or other electro-magnetic field communication capabilities. These devices may be used in connection with a wide variety of networks, such as Mobitex, DataTAC, GSM/GPRS, CDMA, EDGE, UMTS, and CDMA2000 networks.

Portable electronic devices such as PDAs or smart telephones are generally intended for handheld use and ease of portability. A virtual or a physical keyboard for text input is particularly useful on such handheld devices as such handheld devices are small and therefore have limited space for user input devices. Each key of the keyboard may be associated with a primary character, such as a lower case letter in an alphabet, and a plurality of secondary characters, such as a capital letter, symbols, numbers, or diacritic characters. These secondary characters may be entered using a combination of keys, a special mode switch key, or through selection on a touch screen. However, the efficiency of rendering the secondary characters in the existing devices is limited.

Improvements in a more efficient method of rendering secondary characters are therefore desirable.

DETAILED DESCRIPTION

Figure 1:
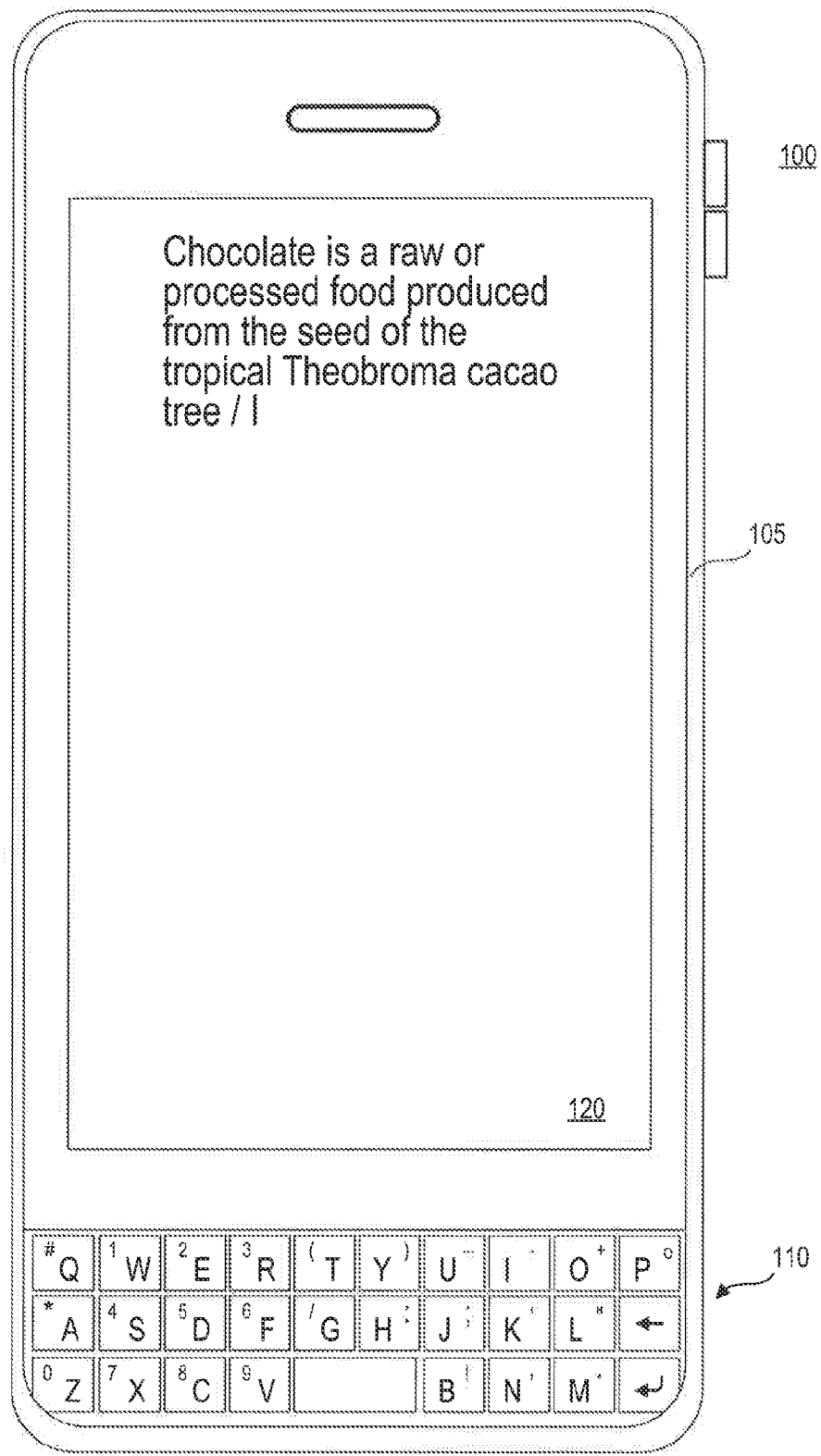
FIG. 1 shows an example of a portable electronic device in accordance with the present disclosure.

Reference will now be made in detail to disclosed examples, which are illustrated in the accompanying drawings. Wherever possible, the same reference numbers will be used throughout the drawings to refer to the same or like parts.

The present disclosure generally relates to an electronic device, such as a portable electronic device. Examples of portable electronic devices include wireless communication devices such as cellular telephones (mobile phones), smart telephones (smart phones), pagers, PDAs, tablet computers, laptop computers, notebook computers, netbook computers, and so forth, with wireless communications capabilities, such as wireless cellular communications capabilities. The portable electronic device may also be a portable electronic device without wireless communications capabilities. Examples include handheld electronic game devices, digital photograph albums, digital cameras, gaming consoles, GPS devices, portable fitness devices, or similar devices.

As disclosed herein, a processor of the portable electronic device may cause secondary characters to be entered in a text editor (such as a text messaging application, a notepad, an email application, etc.) based on one or more inputs received via the physical keyboard that may be associated with one or more capacitive touch sensors. The capacitive touch sensors enable the physical keyboard to also function as a touch pad. Thus, in addition to press inputs, and press and hold inputs, other inputs may also be detected at the physical keyboard, such as, for example, press inputs of a portion of the keyboard, press and hold inputs of a portion of the keyboard, tap inputs of a physical key (or a portion of the keyboard), and drag inputs across the keyboard, etc. The primary character associated with a physical key, such as a lower case letter in the alphabet, may be associated with a press input. That is, the processor may cause the primary character associated with the physical key to be entered into the text editor after detecting a press input of the physical key. Secondary characters associated with the physical key, such as the capital letter of the physical key, diacritic characters, symbols, numbers, may be associated with a tap input or other inputs, as described in below examples.

In one example, when a tap input of the physical key is detected, the processor may cause a symbol associated with the physical key to be entered in the text editor. When a press input of the physical key is detected, the processor may cause the primary character associated with the physical key to be entered in the text editor.

In another example, the processor may enable a diacritic input mode based on detection of a press and hold input of a physical key. While the diacritic input mode is enabled, based on detection of a drag input on the keyboard, the processor may enable display on a screen of one or more secondary characters, such as, for example, diacritic characters associated with the key. As the drag input continues, the diacritic characters may be sequentially selected in a daisy's chain (e.g., if the drag input continues after a selection indicator is displayed at the last diacritic character, the selection indicator will be moved to the first diacritic character, as if the displayed secondary characters form a closed loop). When a desired diacritic character is selected, the processor may cause the selected diacritic character to be entered in the text editor based on various criteria, such as, for example, elapse of a time period, detection of release of the drag input, or detection of a press input of any portion of the keyboard.

In yet another example, the processor may enable the diacritic input mode based on detection of a press input of a physical key followed by at least one tap input of the physical key within a time period. The tap input of the physical key may take place at the physical key or within a tap zone associated with the physical key. While the diacritic input mode is enabled, the processor may detect one or more additional tap inputs. Based on detection of the one or more additional tap inputs, the processor may cause the diacritic characters to be selected sequentially, as if they form a closed loop. The processor may cause the selected diacritic characters to be entered in the text editor based on various criteria, such as, for example, elapse of a time period, detection of a press input of another physical key, etc.

In yet another example, the processor may enable the diacritic input mode based on detection of a tap input of a physical key followed by at least one press input of the physical key within a time period. The processor may detect one or more additional press inputs. Based on detection of the one or more additional press inputs, the processor may cause the diacritic characters to be sequentially selected, as if they form a closed loop. The processor may cause the selected diacritic character to be entered based on various criteria, such as, for example, elapse of a time period, detection of a tap input of another physical key, etc.

FIG. 1 shows an example of a portable electronic device 100 consistent with the present disclosure. The portable electronic device 100 may include a housing 105, a keyboard 110, and a screen 120. The housing 105 may be configured to contain various elements of the portable electronic device 100. The keyboard 110 may include a plurality of keys configured to receive inputs. The keyboard 110 may include a suitable layout, such as QWERTY, QWERTZ, AZERTY, Dvorak, or the like.

The keyboard 110 may be a physical keyboard, and each key is a physical key. Each key on the keyboard 110 may be associated with inputting a primary character and one or more secondary characters. Typically, the primary character is the character that is entered into a text editor (such as a text messaging application, a notepad, an email application, etc.) when a press input of the key is detected. In accordance with this disclosure, secondary characters associated with a selected key are not entered when a press input of the key is detected, unless some other key input, in addition to the press input of the key, is also detected to enable entering of the secondary characters. The secondary characters may include any characters associated with the key (other than a primary character), including, for example, symbols, numbers, capital letters, and diacritic characters. For example, as shown in FIG. 1, the "G" key is associated with a primary character, e.g., the lower case letter "g," and a secondary character, e.g., a symbol "/". It is understood that other secondary characters, such as a capital letter "G" and diacritic characters (e.g., characters of a language other than English) may be associated with the "G" key.

The screen 120 may be any type of screen. In one example, the screen 120 may include a touch-sensitive display (i.e., the screen 120 may be a touch screen). The screen 120 may display data. For example, screen 120 may display a text editor, such as a text message application, an email application, a word processing application, etc. It is understood that the primary or secondary character associated with a key may be entered into the text editor when an input of the key is detected.

Figure 2:
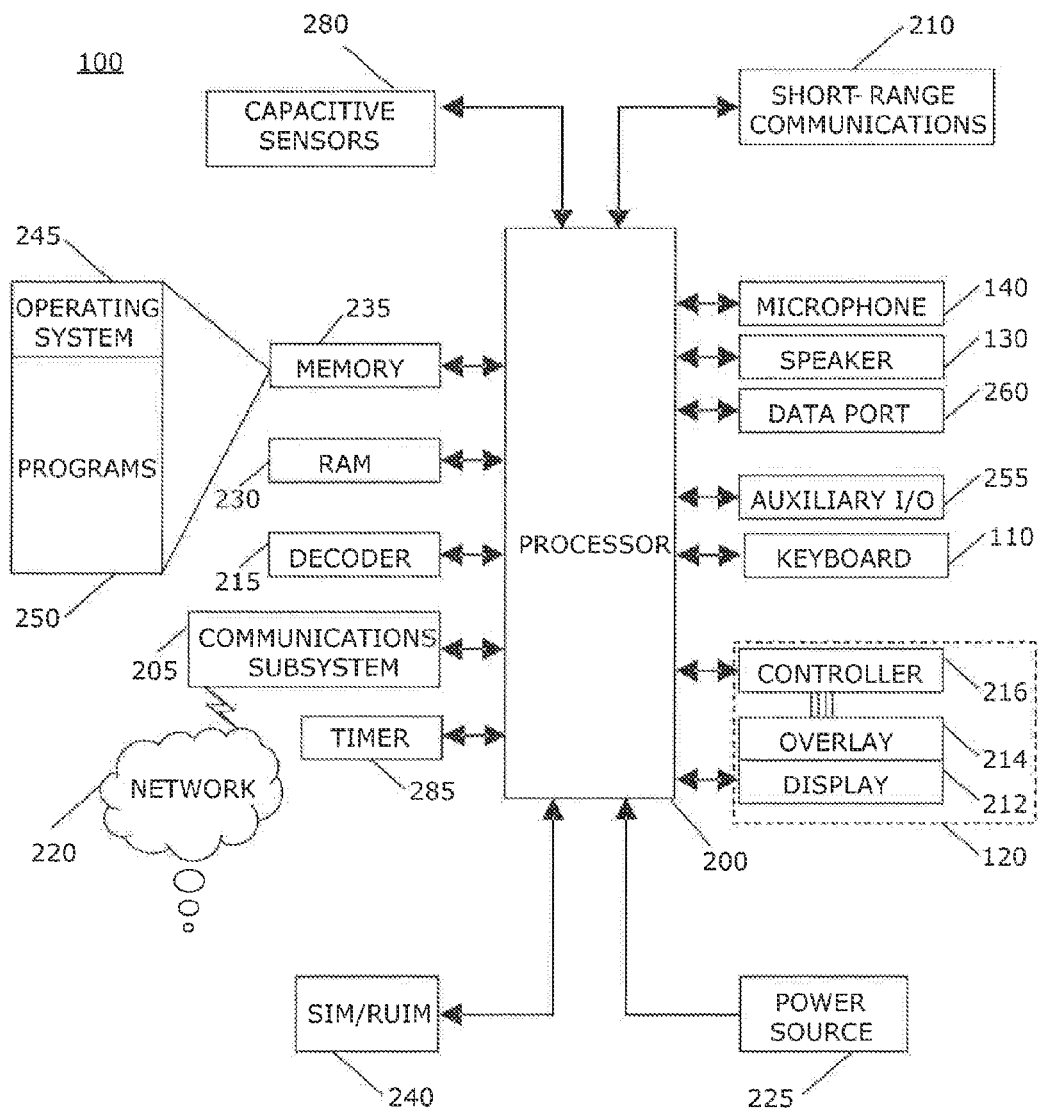
FIG. 2 shows a block diagram of the portable electronic device shown in FIG. 1 in accordance with the present disclosure.

FIG. 2 shows a block diagram of the portable electronic device 100 shown in FIG. 1. The block diagram shows examples of software and hardware elements included in portable electronic device 100. It is understood the portable electronic device 100 may include additional software or hardware elements not shown in FIG. 2, and may not include all of the elements shown in FIG. 2.

The portable electronic device 100 includes a processor 200, which may control the overall operation of portable electronic device 100. The processor 200 may be any suitable processor, and may include software elements (e.g., codes), hardware elements (e.g., circuits), or combination of software and hardware elements. The processor 200 may be electronically connected to and may control other elements of the portable electronic device 100. The portable electronic device 100 includes a communications subsystem 205 and a short-range communications module 210 to perform various communication functions, including data and voice communications. Data received by the portable electronic device 100 may be decompressed and decrypted by a decoder 215. The communications subsystem 205 may receive messages from and may send messages to a network 220. The network 220 may be any type of network, including, but not limited to, data wireless networks, voice wireless networks, and networks that support both voice and data communications. The network 220 may be wired or wireless.

The portable electronic device 100 includes a power source 225, such as one or more rechargeable batteries or a port to an external power supply, which may supply power to various elements of the portable electronic device 100.

The portable electronic device 100 includes one or more memories, such as, for example, a Random Access Memory (RAM) 230 and a memory 235. The RAM 230 and the memory 235 may be any type of memory, for example, a non-transitory flash memory. The RAM 230 and memory 235 may store instructions or codes that may be executable by the processor 200 to perform various functions, methods, processes, or operations discussed in the present disclosure. The RAM 230 and memory 235 may also store data. Processor 200 may read data from the memories, or may send data to the memories for storage. Although not shown, it is understood that the portable electronic device 100 may include other data storage devices, such as a hard disk.

The screen 120 includes a display 212, which may be a touch-sensitive display. The display 212 may be coupled to a touch-sensitive overlay 214 and an electronic controller 216. User interaction with a graphical user interface (GUI) may be performed through the touch-sensitive overlay 214. The processor 200 may interact with the touch-sensitive overlay 214 via the electronic controller 216. The processor 200 may cause display on the screen 120 of various data, such as text, characters, symbols, images, icons, and other items.

To identify a subscriber for network access, the portable electronic device 100 may use a Subscriber Identity Module or a Removable User Identity Module (SIM/RUIM) card 240 for communication with a network, such as the network 220, which may be wireless. Alternatively or additionally, user identification information may be programmed into memory 235 or RAM 230.

The portable electronic device 100 includes an operating system 245 and one or more software programs or modules 250. The operating system 245 and software programs or modules 250 contains codes or instructions that may be executed by the processor 200 for performing various processes or methods disclosed in the present disclosure. The operating system 245 and software programs or modules 250 may be stored in a non-transitory, persistent, updatable storage device, such as the memory 235. Additional applications or programs may be loaded onto the portable electronic device 100 through the network 220, an auxiliary I/O subsystem 255, a data port 260 (e.g., a USB port), or the short-range communications subsystem 210.

A received data or signal, such as a text message, an email message, or web page download, may be processed by the communications subsystem 205 and input to the processor 200. The processor 200 may process the received data or signal for output to at least one of the display 212 or the auxiliary I/O subsystem 255. A subscriber may generate data items, for example email messages, which may be transmitted over the network 220 (which may be wireless) through the communications subsystem 205, for example.

The portable electronic device 100 may include one or more capacitive touch sensors 280. The capacitive touch sensors 280 may be associated with the keyboard 110. It is understood that the capacitive touch sensors 280 may also be associated with other elements of the portable electronic device 100 configurable to receive touch input, such as a microphone 140, a speaker 130, and the data port 226. In some examples, the capacitive touch sensors 280 may be disposed under the keyboard 110. Each key on the keyboard 110 may be associated with one or more capacitive touch sensors 280. Because the capacitive touch sensors 280 may be disposed under the keyboard 110, the entire keyboard 110 may function as a touch pad.

In response to different inputs (such as a tap input, a press input, a hold input, and a drag input) received at the keyboard 110, the capacitive touch sensors 280 generate different signals representing different capacitance changes corresponding to the different inputs. For example, the capacitive touch sensors 280 may generate a signal indicating a small capacitance change in response to a tap input, and may generate a different signal indicating a large capacitance change in response to a press input. The processor 200 determines that the input is a tap input when the capacitance change is smaller than a threshold value, and that the input is a press input when the capacitance change is larger than the threshold value. A hold input is an input when a tap input or a press input has been maintained for a period of time. A drag input or swipe is when a touch input is detected and the touch is maintained while detecting a move of the touch across the keyboard 110. For example, a drag input is when a user touches a key with a finger, and subsequently moves the finger across the keyboard 110 while maintaining the finger touching the keyboard.

The portable electronic device 100 may include a timer 285. The timer 285 may be configured to count or calculate an amount of time that has elapsed. For example, the timer 285 may be configured to count or calculate the amount of time elapsed following an event, such as detection of a press and hold input of a key. As another example, the processor 200 may determine whether a hold input is detected based on the elapsed time calculated by the timer 285 following the detection of a press input. The timer 285 may be a timer unit internal to the processor 200, or may be a timer unit separate from the processor 200.

Figures 3A, 3B:
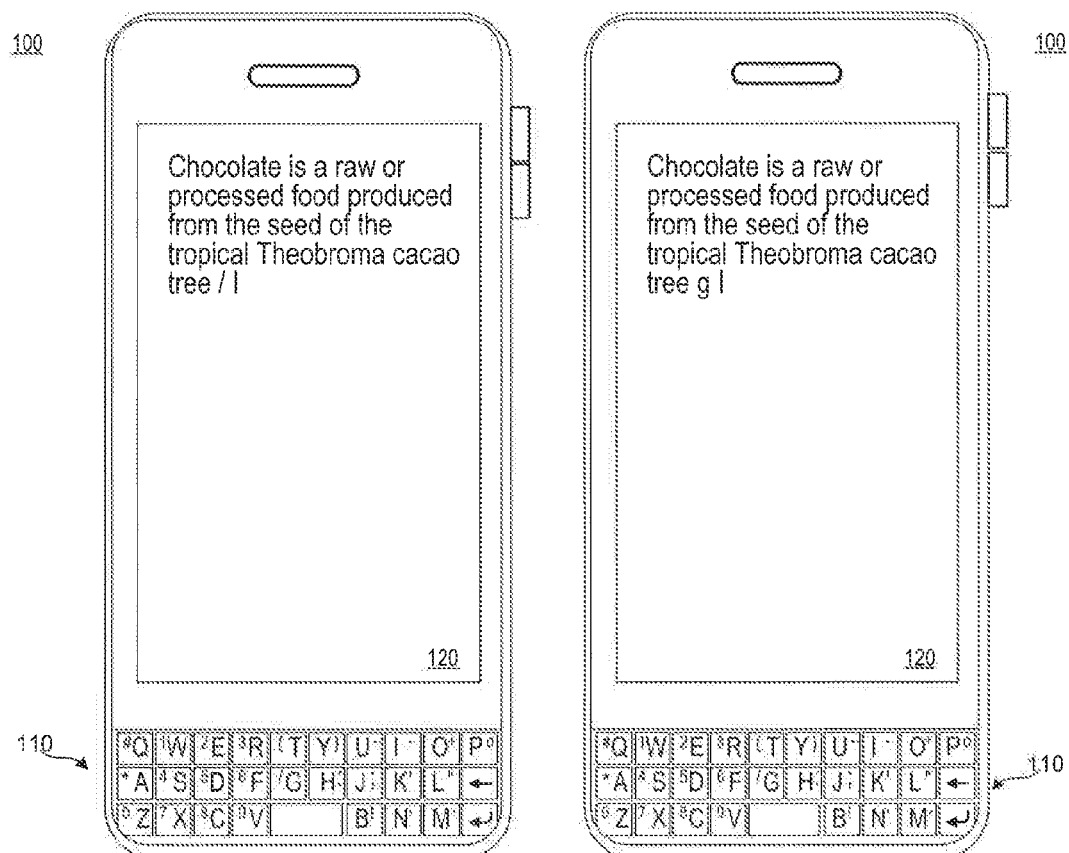
FIG. 3A shows an example of an operation for rendering a secondary character in accordance with the present disclosure.
FIG. 3B shows an example of an operation for rendering a primary character in accordance with the present disclosure.

FIG. 3A shows an example of an operation for rendering a secondary character in accordance with the present disclosure. FIG. 3B shows an example of an operation for rendering a primary character in accordance with the present disclosure. As discussed above, with capacitive touch sensors 280 disposed under the keyboard 110, the processor 200 may distinguish a tap input of a physical key from a press input of the physical key. As shown in FIG. 3A, when the processor 200 detects a tap input of the physical key "G," the processor 200 causes the symbol "I" associated with the physical key "G" to be entered in a text editor, as shown on the screen 120 in FIG. 3A. In other words, based on detection of the tap input, the processor 200 enables display on the screen 120 of the secondary character (e.g., the symbol "I") associated with the physical key "G.". As shown in FIG. 3B, when the processor 200 detects a press input of the physical key "G," the processor 200 causes the primary character, e.g., the lower case letter "g," to be entered in the text editor, as shown on the screen 120 in FIG. 3B. In other words, based on detection of the press input of the key "G," the processor 200 enables display on the screen 120 of the primary character (e.g., the lower case letter "g") associated with the key "G." Although a symbol is used as an example of a secondary character in FIGS. 3A and 3B, it is understood that the secondary character may also be other characters, such as a number (e.g., number 6 associated with the "F" key), or other secondary characters that are not shown in FIGS. 3A and 3B.

Figure 4:
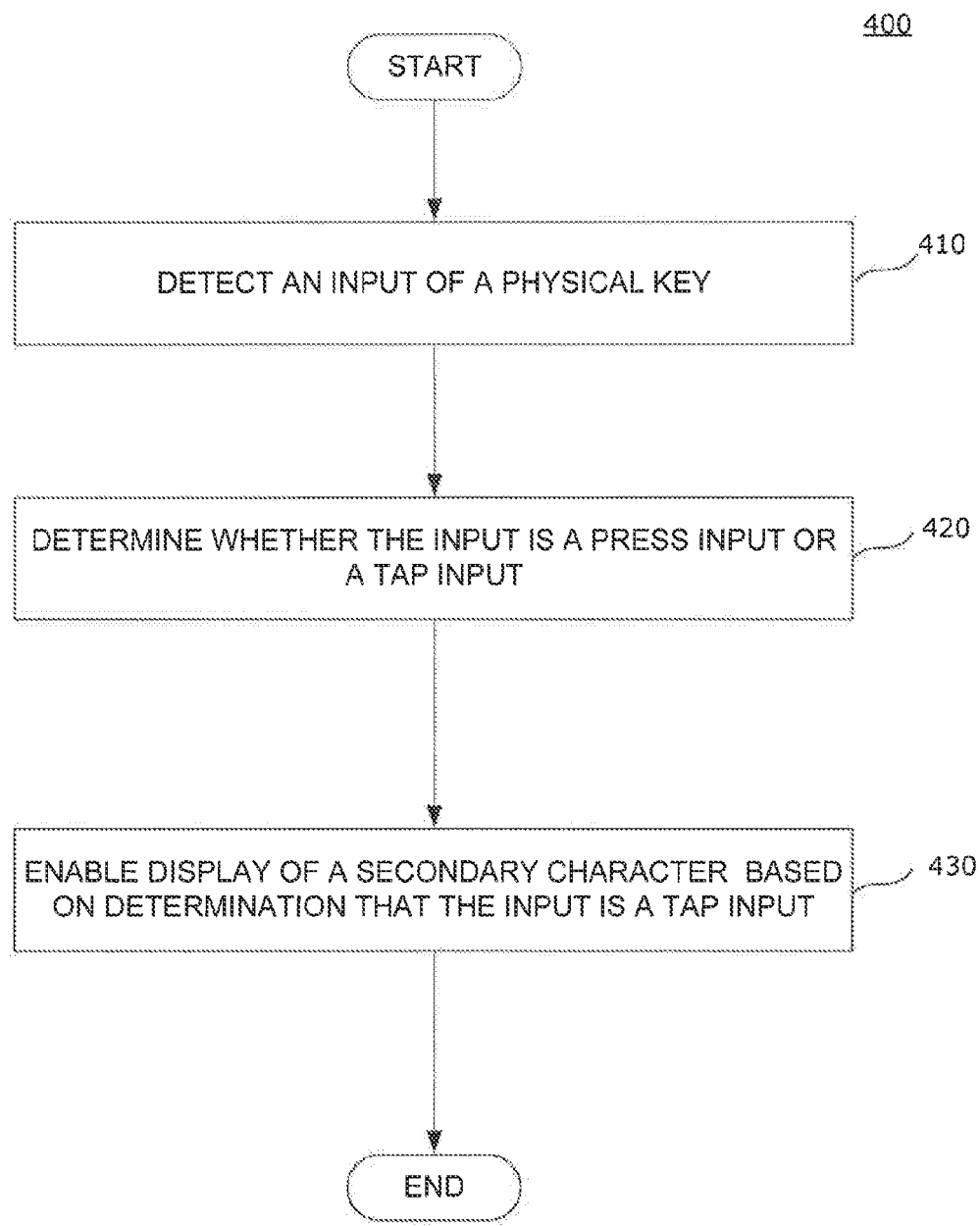
FIG. 4 shows an example of a process for rendering a secondary character in accordance with the present disclosure.

FIG. 4 shows an example of a process 400 for rendering a secondary character in accordance with the present disclosure. The process shown in FIG. 4 relates to the operations shown above in connection with FIGS. 3A and 3B. It is understood that the process 400 may be performed in any order, including, but not limited to, the order of steps shown in FIG. 4. Additional or intervening steps may also be performed.

In the process 400 shown in FIG. 4, the processor 200 detects an input of a physical key (e.g., the physical key "G" shown in FIGS. 3A and 3B) (step 410). The processor 200 determines whether the input is a press input or a tap input (step 420) based, for example, on a determination using signals received from the capacitive touch sensors 280. The processor 200 enables display of a secondary character based on the determination that the input is a tap input (step 430). For example, when the processor 200 determines that the input is a tap input, the processor 200 enables display of the secondary character (e.g., the symbol "I" shown in FIG. 3A) that is associated with the tap input of the physical key (e.g., the "G" key). On the other hand, when the processor 200 determines that the input is a press input, the processor 200 enables display of the primary character (e.g., the lower case letter "g") associated with the press input of the physical key (e.g., the "G" key shown in FIG. 3A). Although not shown in FIG. 4, the process 400 may include other operations discussed above in connection with FIGS. 3A and 3B.

Figure 5:
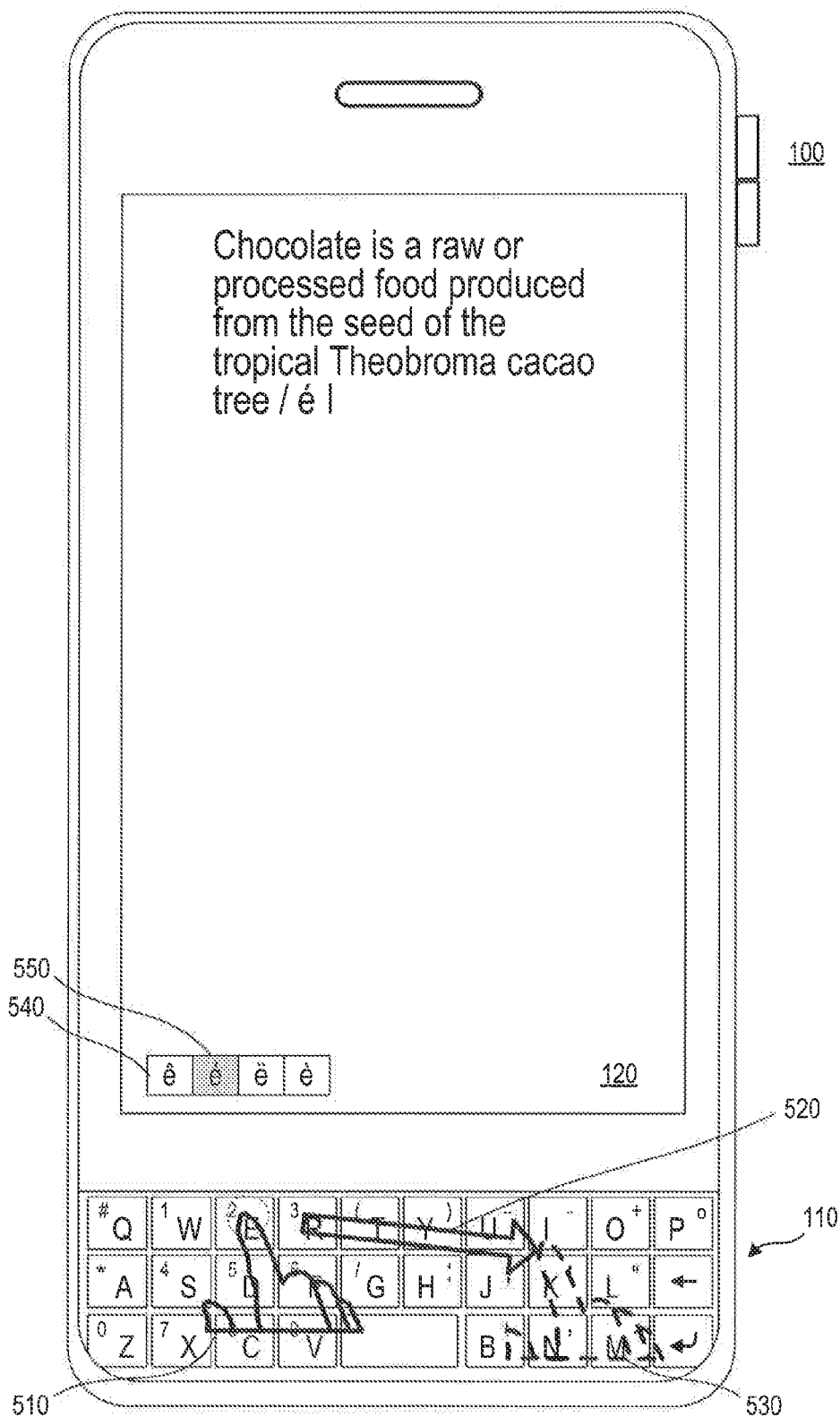
FIG. 5 shows an example of an operation for rendering a secondary character in accordance with the present disclosure.

FIG. 5 shows another example of an operation for rendering a secondary character in accordance with the present disclosure. In the example shown in FIG. 5, the "E" key is associated with a primary character, the lower case letter "e", and one or more secondary characters, such as diacritic characters "ê, é, ë, è." The processor 200 may enable a diacritic input mode when the processor 200 detects a press and hold input of a physical key. As shown in FIG. 5, the processor 200 detects a press and hold input of the "E" key (e.g., when a user finger presses and holds the "E" key as indicated by reference 510). The processor 200 enables the diacritic input mode based on detection of the press and hold input of the "E" key. While the diacritic input mode is enabled, the processor 200 enables display on the screen 120 of a list 540 of secondary characters, such as diacritic characters "ê, é, ë, è" associated with the "E" key. Although diacritic characters are used as examples of the secondary characters, it is understood that the list 540 may also include other secondary characters, such as the capital letter "E" that is associated with the "E" key.

In the example shown in FIG. 5, the processor 200 detects a drag input on the keyboard 110, as indicated by the arrow 520, following detection of the press and hold input of the "E" key. The drag input may originate from the "E" key, where the press and hold input is detected, and slide away from the "E" key across the keyboard 110 in any direction (e.g., to the right of the key). Based on detection of the drag input, the processor 200 enables display on the screen 120 of a selection indicator 550 indicating selection of a secondary character among the one or more secondary characters displayed on the screen 120. For example, the processor 200 may enable display of the indicator 550 at one the first diacritic character "ê" to indicate selection of the first diacritic character when the drag input is first detected. Alternatively, before detecting the drag input, when the list 540 is displayed based on detection of the press and hold input of the "E" key, the indicator 550 may be displayed at the first diacritic character "ê" to indicate selection of the first diacritic character. As the processor 200 continues to detect the drag input (e.g., as the drag input continues to move across the keyboard 110), the processor 200 may enable display of the indicator 550 sequentially moving among the one or more secondary characters displayed on the screen 120. For example, the indicator 550 may be initially displayed at the first diacritic character "ê" at the start of the drag input to indicate selection of the first diacritic character "ê." As the processor 200 continues to detect the drag input moving across the keyboard 110, e.g., to reach the current location indicated by reference 530, the processor 200 may cause the indicator 550 to be displayed at the second diacritic character "é." If the processor 200 detects the drag input further moving across the keyboard 110, the processor 200 may cause the indicator 550 to be displayed at the third and fourth diacritic characters "ë" and "è" in the list 540. When the indicator 550 reaches the end of the list 540, the indicator 550 may return to the first secondary character (e.g., the first diacritic character "ê") in the list 540 and repeat cyclical movement to sequentially indicator the selected diacritic character as the drag input continues.

In some examples, when the processor 200 detects a release of the drag input, e.g., release of a finger from the keyboard 110, the processor 200 causes the selected secondary character (e.g., the second diacritic character "é") as indicated by the indicator 550 to be entered into the text editor. After the selected secondary character (e.g., the second diacritic character "é") is entered into the text editor, the processor 200 may disable the diacritic input mode.

In some examples, when the processor 200 detects a press input on the keyboard 110 following detection of the drag input (e.g., a press input on the keyboard 110 at the location indicated by reference 530), the processor 200 causes the selected secondary character (e.g., the second diacritic character "é") as indicated by the indicator 550 to be entered into the text editor. The press input may be detected at a current location of the drag input, which may be any portion of the keyboard 110 (e.g., a key or a portion between two keys). Due to the capacitive touch sensors disposed under the keyboard 110, the entire keyboard 110 may be used as a touch pad for receiving inputs. Thus, it is possible to detect a press input even if the press input does not correspond to a key. After the selected secondary character is entered, the processor 200 may disable the diacritic input mode.

Figure 6:
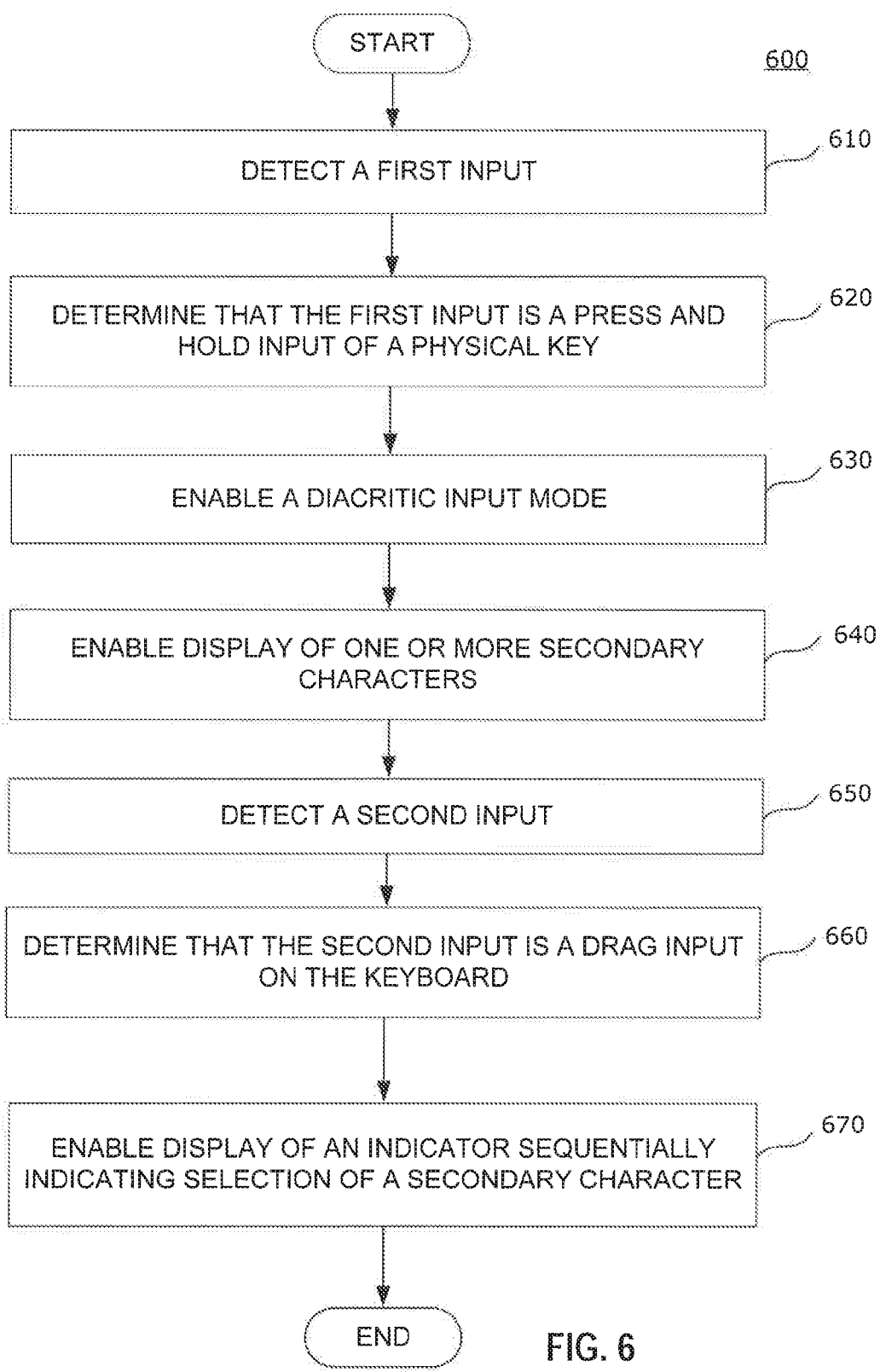
FIG. 6 shows an example of a process for rendering a secondary character in accordance with the present disclosure.

FIG. 6 shows an example of a process 600 for rendering a secondary character in accordance with the present disclosure. The process 600 relates to the operations discussed above in connection with the example shown in FIG. 5. It is understood that the process 600 may be performed in any order, including, but not limited to, the order of steps shown in FIG. 6. Additional or intervening steps may also be performed.

In the example process 600 shown in FIG. 6, the processor 200 detects a first input (step 610). The processor 200 determines that the first input is a press and hold input of a physical key (e.g., the "E" key shown in FIG. 5) (step 620). The processor 200 enables a diacritic input mode based on the determination that the first input is the press and hold input (step 630). While the diacritic input mode is enabled, the processor 200 enables display on the screen 120 one or more secondary characters (e.g., the list 540 of diacritic characters shown in FIG. 5) associated with the physical key (step 640). The processor 200 detects a second input (step 650). The processor 200 determines that the second input is a drag input on the keyboard 110 (e.g., as indicated by the reference 520 shown in FIG. 5) (step 660). The processor 200 detects the drag input following detection of the press and hold input of the physical key. The drag input may originate from the physical key and move across the keyboard 110. The processor 200 enables display on the screen 120 of an indicator (e.g., indicator 550) reflecting selection of a secondary character (e.g., the second diacritic character "é" shown in FIG. 5) among the one or more secondary characters while the drag input is detected (step 670). For example, when the processor 200 detects the drag input continuously moving across the keyboard 110, the processor 200 enables display of the indicator 550 sequentially moving among the one or more secondary characters to indicate selection of a secondary character.

Although not shown in FIG. 6, the process 600 may include other operations discussed above in connection with the example shown in FIG. 5. For example, when the processor 200 detects a release of the drag input (e.g., release of the user finger), the processor 200 may enable the selected secondary character that is indicated by the indicator 550 to be entered into the text editor. Alternatively, when the processor 200 detects a press input on the keyboard 110 following the detection of the drag input, the processor 200 may enable the selected secondary character that is indicated by the indicator 550 to be entered in the text editor. After the selected secondary character is entered into the text editor, the processor 200 may disable the diacritic input mode.

Figure 7:
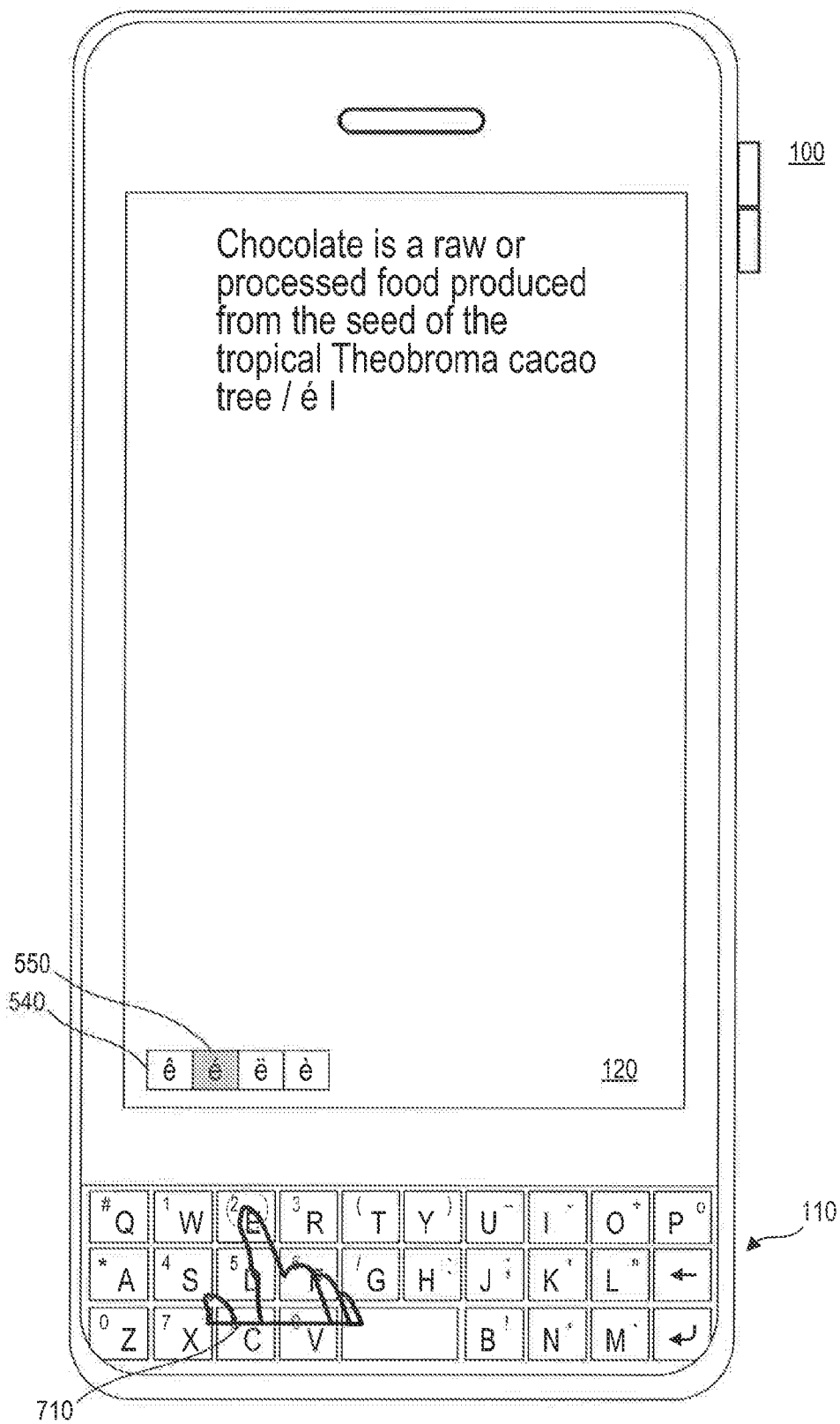
FIG. 7 shows another example of an operation for rendering a secondary character in accordance with the present disclosure.

FIG. 7 shows another example of an operation for rendering a secondary character in accordance with the present disclosure. In the example shown in FIG. 7, the processor 200 detects a press input of a physical key (e.g., the "E"

key). The press input may be a short press or a long press (e.g., a press and hold input). Within a first time period following the detection of the press input of the "E" key, the processor 200 also detects a first tap input of the "E" key. The processor 200 enables the diacritic input mode based on detection of the first tap input. The time elapsed following the detection of the press input may be counted or calculated by the timer 285 and compared, by the processor 200, to the first time period. The first time period may be predetermined, e.g., 0.5 second. The first time period may also be dynamically set, for example, based on inputs from a user (e.g., the speed of user inputs) or other conditions (e.g., the overall computing load, etc.) of the portable electronic device 100.

While the diacritic input mode is enabled, the processor 200 may enable display on the screen 120 one or more secondary characters associated with the "E" key. For example, the processor 200 may enable display of the list 540 of diacritic characters "ê, é, ë, è" that are associated with the "E" key. Although diacritic characters are used as examples of the secondary characters, it is understood that the list 540 may also include other secondary characters, such as the capital letter "E."

In the example shown in FIG. 7, the first tap input may be detected by the processor 200 at the "E" key, i.e., the same key where the press input is detected. Alternatively, the first tap input may be detected on any portion of the keyboard 110 within a tap zone associated with the "E" key. As mentioned above, due to the capacitive touch sensors disposed under the keyboard 110, the entire keyboard 110 may be used as a touch pad for receiving inputs.

Figure 8A:
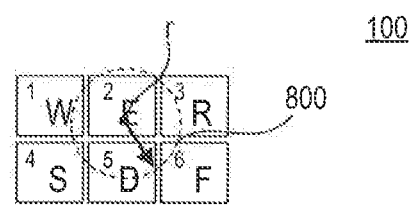
FIG. 8A shows an example of a tap zone associated with rendering a secondary character in accordance with the present disclosure.
Figure 8B:
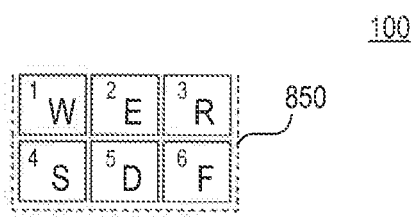
FIG. 8B shows another example of a tap zone associated with rendering a secondary character in accordance with the present disclosure.

FIGS. 8A and 8B show examples of the tap zone. For example, as shown in FIG. 8A, a tap zone 800 around the "E" key may be defined by a circle having a radius r. The radius r may be calculated from the center of the "E" key. As shown in FIG. 8A, the tap zone 800 may include only a portion of the "W" key, the "D" key, the "F" key, and the "R" key, but not the entire "W" key, the entire "D" key, the entire "F" key, and the entire "R" key. A tap input detected at any portion of the keyboard 110 that falls within the circle may be regarded as a tap input of the "E" key. For example, the first tap input may be detected by the processor 200 as long as the first tap input is detected within the tap zone 800. The tap zone 800 includes any portion of the keyboard 110 within the circle, including portions between two keys.

Alternatively, the tap zone for the "E" key may be defined by the keys surrounding the "E" key. As shown in FIG. 8B, for example, a tap zone 850 for the "E" key may be defined by its surrounding keys. The tap zone 850 may include the entire key of each of the "E" key, the "W" key, the "S" key, the "D" key, the "F" key, and the "R" key. A tap input detected at any of the keys within the tap zone 850 may be regarded as a tap input of the "E" key. For example, the first tap input may be detected by the processor 200 as long as the first tap input is detected on any key within the tap zone 850.

In the example shown in FIG. 7, the processor 200 may detect one or more subsequent tap inputs of the "E" key (e.g., second and third tap inputs) within a second time period following detection of the first tap input. The time elapsed following detection of the first tap input may be counted or calculated by the timer 285, and may be compared with the second time period by the processor 200. The second time period may be the same as or different from the first time period. The second time period may be predetermined, e.g., 0.4 second. The second time period may also be dynamically set, for example, based on inputs from a user (e.g., the speed of user inputs) or other conditions (e.g., the overall computing load, etc.) of the portable electronic device 100. The one or more subsequent tap inputs may be detected on the same "E" key, or within the tap zone of the "E" key, such as the tap zones 800 and 850 discussed above in connection with FIGS. 8A and 8B.

In the example shown in FIG. 7, based on detection of the one or more subsequent tap inputs of the "E" key, the processor 200 may enable display on the screen 120 the indicator 550 sequentially indicating selection of a secondary character among the one or more secondary characters. For example, when the processor 200 detects the first tap input of the "E" key, the processor 200 may enable display of the indicator 550 at the first diacritic character "ê" to indicate selection of the first diacritic character. Alternatively, in one example, after detecting the press and hold input and before detecting the first tap input, the processor 200 may enable display of the indicator 550 along with the list 540, with the indicator 550 located at the first diacritic character "ê" to indicate selection of the first diacritic character. When the processor 200 detects a second tap input of the "E" key within the second time period following detection of the first tap input, the processor 200 may enable display of the indicator 550 at the second diacritic character "é" to indicate selection of the second diacritic character. Likewise, if the processor 200 detects a third and a fourth tap input, each being detected within the second time period following the detection of the previous tap input, the processor 200 may enable display of the indicator 550 at the third diacritic character "ë" and the fourth diacritic character "è" sequentially to indicate selection of the third and the fourth diacritic characters respectively. In other words, when the processor 200 detects one or more tap inputs of the "E" key following the detection of the first tap input of the "E" key, with each subsequent tap input being detected within the second time period following the detection of the previous tap input, the processor 200 may enable display on the screen 120 the indicator 550 sequentially moving among the displayed diacritic characters to indicate selection of one of the diacritic characters with the list 540 being in a daisy chain such that a tap at the fourth diacritic returns to the first, as if the diacritic characters form a closed loop.

In the example shown in FIG. 7, while the list 540 of diacritic characters is displayed on the screen 120, the processor 200 may detect that a third time period has elapsed following the detection of the tap input(s) (e.g., following the last detected tap input). If only the first tap input is detected, the last tap input is the first tap input. If one or more tap inputs are detected following the detection of the first tap input, the last tap input is the last one of the one or more tap inputs. The third time period may be the same as or different from the first and second time periods. The third time period may be predetermined, e.g., 1 second. The third time period may also be dynamically set, for example, based on inputs from a user (e.g., the speed of user inputs) or other conditions (e.g., the overall computing load, etc.) of the portable electronic device 100. The time elapsed following the detection of the last tap input may be counted or calculated by the timer 285 and compared by the processor 200 to the third time period. When the processor 200 detects that the third time period has elapsed following the detection of the last tap input, the processor 200 may cause the selected secondary character (e.g., the second diacritic character "é") that is indicated by the indicator 550 to be entered into the text editor.

Figure 9:
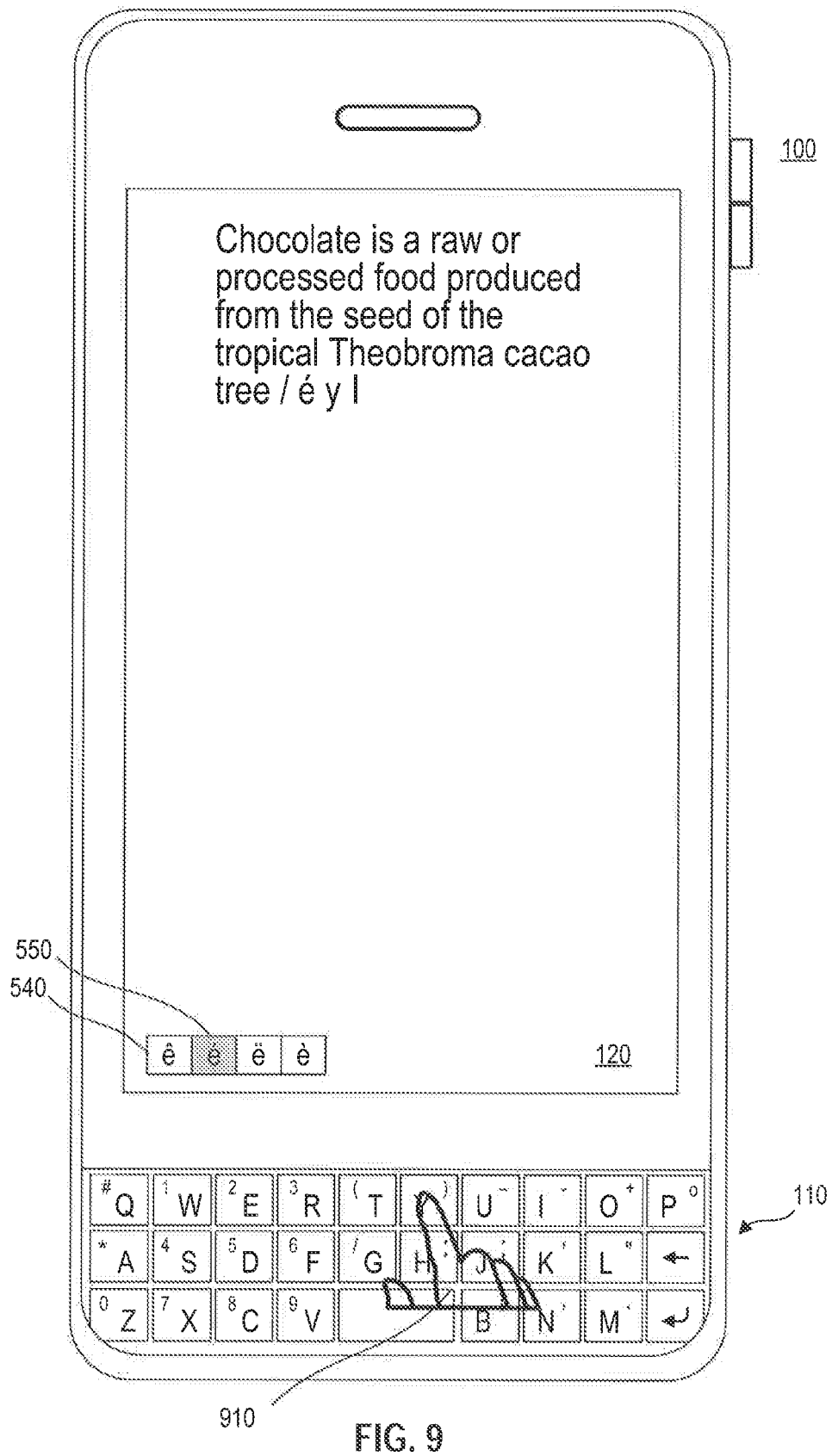
FIG. 9 shows an example of an operation for rendering a secondary character in accordance with the present disclosure.

Alternatively, the selected secondary character (e.g., the second diacritic character "é") indicated by the indicator 550 may be entered based on detection of a press input of another physical key. FIG. 9 illustrates an example of operation for rendering the secondary character in accordance with the present disclosure. Compared to the example shown in FIG. 7, the example shown in FIG. 9 illustrates that the selected secondary character may be entered based on detection of a press input of another physical key. Thus, detailed discussions of other operations that are similar to those discussed above in connection with the example shown in FIG. 7 are not repeated. In the example shown in FIG. 9, while the list 540 of diacritic characters are displayed on the screen 120, with the indicator 550 displayed at the second diacritic character "ê," the processor 200 detects a press input at another physical key, e.g., the "Y" key. The processor 200 causes the selected second diacritic character "ê" to be entered in the text editor on the screen 120, as shown in FIG. 9. The processor 200 also causes the primary character, e.g., lower case letter "y", associated with the "Y" key to be entered into the text editor following the entered diacritic character "ê," as shown in FIG. 9. Although not shown, it is understood that when the processor 200 detects a tap input of the physical key "Y" within the second time period following the detection of the press input of the physical key "Y," the processor 200 may enable display on the screen 120 one or more secondary characters associated with the physical key "Y," and may cause a selected secondary character to be entered upon detection of short pause (e.g., elapse of the third time period), or upon detection of a press input of another physical key, to replace the just entered primary character, i.e., the lower case letter "y."

Figure 10:
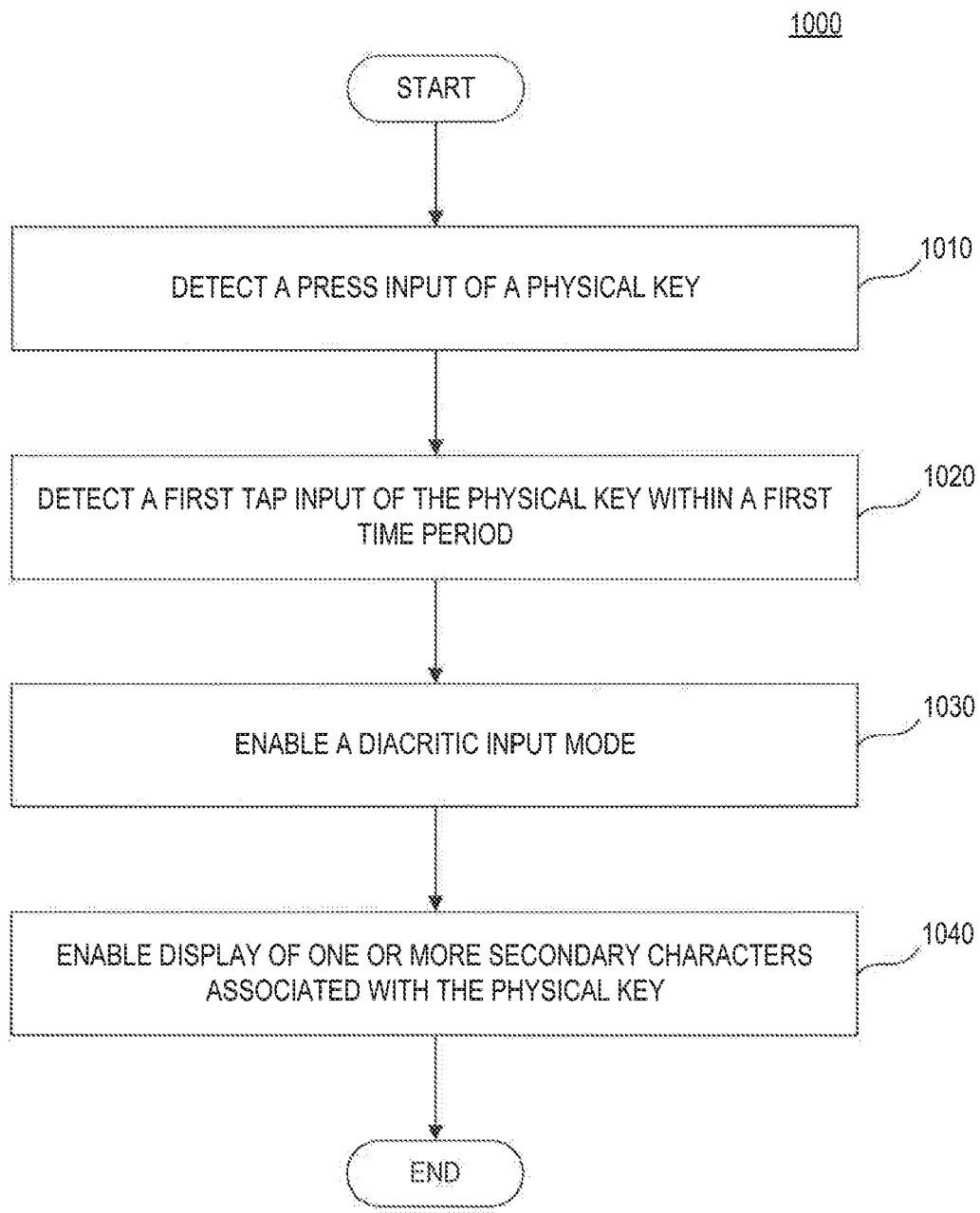
FIG. 10 shows an example of a process for rendering a secondary character in accordance with the present disclosure.

FIG. 10 shows another example of a process 1000 for rendering a secondary character in accordance with the present disclosure. The process 1000 relates to the operations discussed above in connection with the examples shown in FIGS. 7-9. It is understood that the process 1000 may be performed in any order, including, but not limited to, the order of steps shown in FIG. 10. Additional or intervening steps may also be performed.

In the example process 1000, the processor 200 detects a press input of a physical key (e.g., the "E" key) (step 1010). The processor 200 detects a first tap input of the physical key within a first time period following the detection of the press input (step 1020). As discussed above in connection with FIGS. 7, 8A, and 8B, the first tap input may be detected at the same physical key or within a tap zone of the physical key. The processor 200 enables a diacritic input mode based on detection of the first tap input (step 1030). While the diacritic input mode is enabled, the processor 200 enables display on the screen 120 one or more secondary characters (e.g., diacritic characters "ê, é, ë, è" shown in FIGS. 7 and 9) associated with the physical key (step 1040).

Although not shown in FIG. 10, the process 1000 may include other operations discussed above in connection with FIGS. 7-9. For example, while the one or more secondary characters are displayed on the screen, the processor 200 may display an indicator (e.g., indicator 550 shown in FIGS. 7 and 9) indicating selection of a secondary character among the one or more secondary characters (e.g., diacritic characters "ê, é, ë, è"). The processor 200 may detect one or more subsequent tap inputs of the physical key (e.g., the "E" key) within the second time period following the detection of the first tap input. The processor 200 may enable display on the screen 120 the indicator 550 cyclically moving among the one or more secondary characters to indicate selection of a secondary character based on detection of the one or more subsequent tap inputs. The processor 200 may detect that the third time period has elapsed following the detection of the last tap input, and may cause the selected secondary character (e.g., the second diacritic character "ê") that is indicated by the indicator 550 to be entered into the text editor on the screen 120. Alternatively, the processor 200 may detect a press input of another physical key (e.g., the "Y" key shown in FIG. 9) following the detection of the last tap input, and may cause the selected secondary character indicated by the indicator 550 to be entered into the text editor on the screen 120, along with the primary character (e.g., the lower case letter "y") associated with the other physical key (e.g., the "Y" key).

Figure 11:
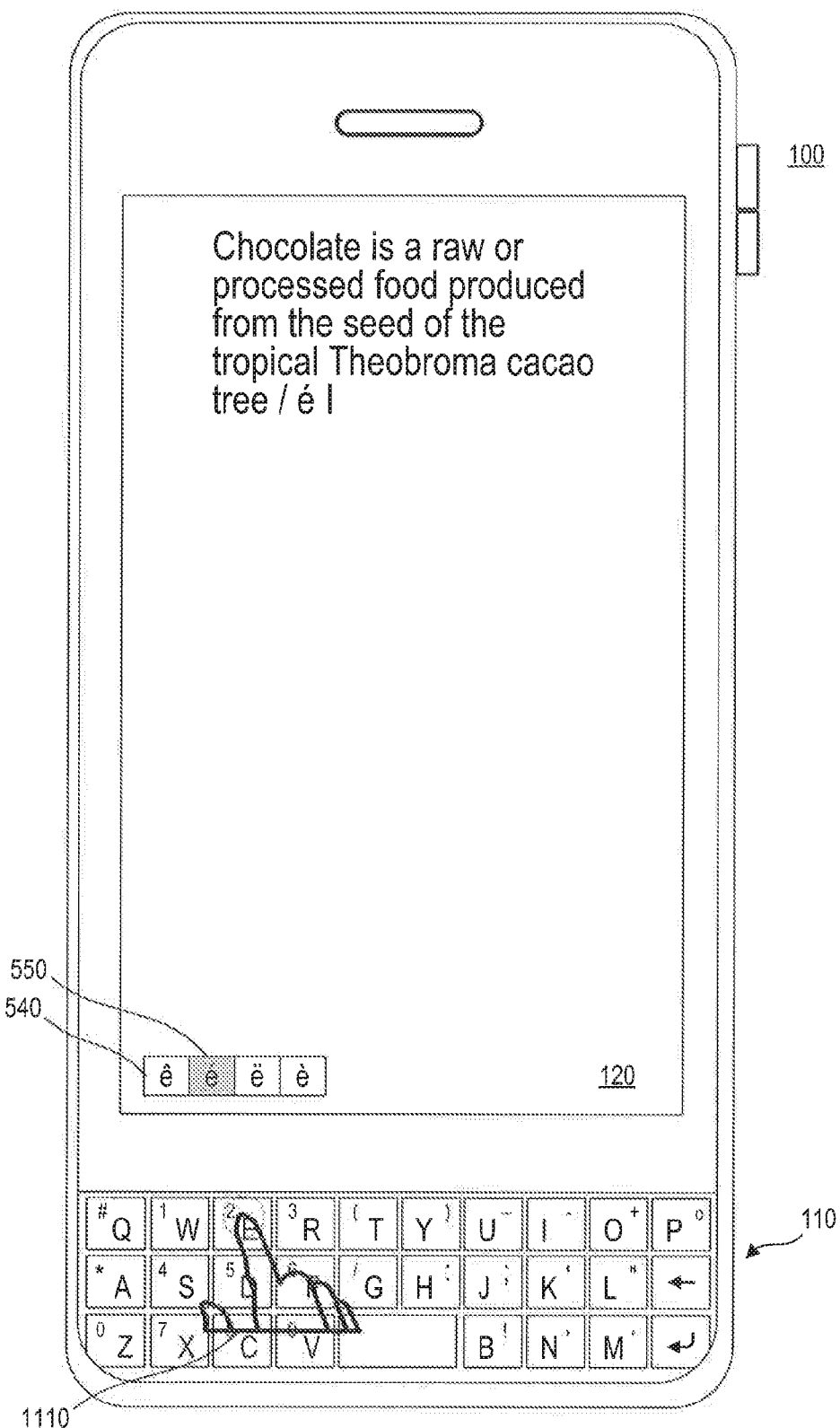
FIG. 11 shows an example of an operation for rendering a secondary character in accordance with the present disclosure.

FIG. 11 shows another example of an operation for rendering a secondary character in accordance with the present disclosure. The example shown in FIG. 11 is different from that shown in FIGS. 7-10, in that in the example shown in FIGS. 7-10, the diacritic input mode is enabled after detecting a press input followed by a tap input within the first time period, whereas in the example shown in FIG. 11, the diacritic input mode is enabled after detecting a tap input followed by a press input within a time period, which may be the same as or different from the first time period. In the example shown in FIG. 11, the processor 200 detects a tap input of a physical key, e.g., the "E" key, as indicated by reference 1110. Within a time period following the detection of the tap input, when the processor 200 detects a press input of the "E" key, the processor 200 enables a diacritic input mode based on detection of the first press input of the "E" key. The time period in this example may be the same as or different from the first time period discussed above in connection with the examples shown in FIGS. 7 and 9. Similar to the first time period, the time period in this example may be predetermined or dynamically set based on inputs from a user (e.g., the speed of user inputs) or other conditions (e.g., the overall computing load, etc.) of the portable electronic device 100. While the diacritic input mode is enabled, the processor 200 enables display on the screen 120 a list 540 of one or more secondary characters (e.g., diacritic characters "ê, é, ë, è") associated with the physical key "E." It is understood that other secondary characters (e.g., the capital letter "E") associated with the physical key "E" may also be displayed. Similar to the examples shown in FIGS. 5, 7, and 9, in the example shown in FIG. 11, the processor 200 may enable display of the indicator 550 cyclically indicating selection of a secondary character among the one or more secondary characters. The first press input detected following the tap input may be detected on the same physical key "E," or within a press zone. The press zone for the "E" key may be defined in ways similar to the tap zones 800 and 850 discussed above in connection within FIGS. 7, 8A, and 8B. The processor 200 may detect one or more press inputs of the "E" key (e.g., a second press input and a third press input) following the detection of the first press input within a time period, which may be the same as or different from the second time period discussed above in connection with FIGS. 7 and 9. Based on the detection of the one or more press inputs of the "E" key, the processor 200 may enable display of the indicator 550 cyclically moving among the one or more secondary characters to indicate selection of a secondary character. Similar to the examples discussed above in connection with FIGS. 7 and 9, when the processor 200 detects a short pause (e.g., the third time period has elapsed) following the detection of the last press input of the "E" key (e.g., following the second press input), the processor 200 may cause the selected diacritic character (e.g., "ê") to be entered into the text editor on the screen 120. The last press input is the last press input that is detected by the processor 200. For example, if only the first press input is detected, the first press input is the last press input. If two subsequent press inputs are detected following the first press input, the third press input is the last press input. Alternatively, when the processor 200 detects a tap input of another key (e.g., the "Y" key), the processor 200 may cause the selected diacritic character (e.g., "é") to be entered in the text editor on the screen 120. It is understood many features discussed above in connection with the examples shown in FIGS. 7-9 may also be included in the example shown in FIG. 11. The detailed discussions of those features are not repeated here.

Figure 12:
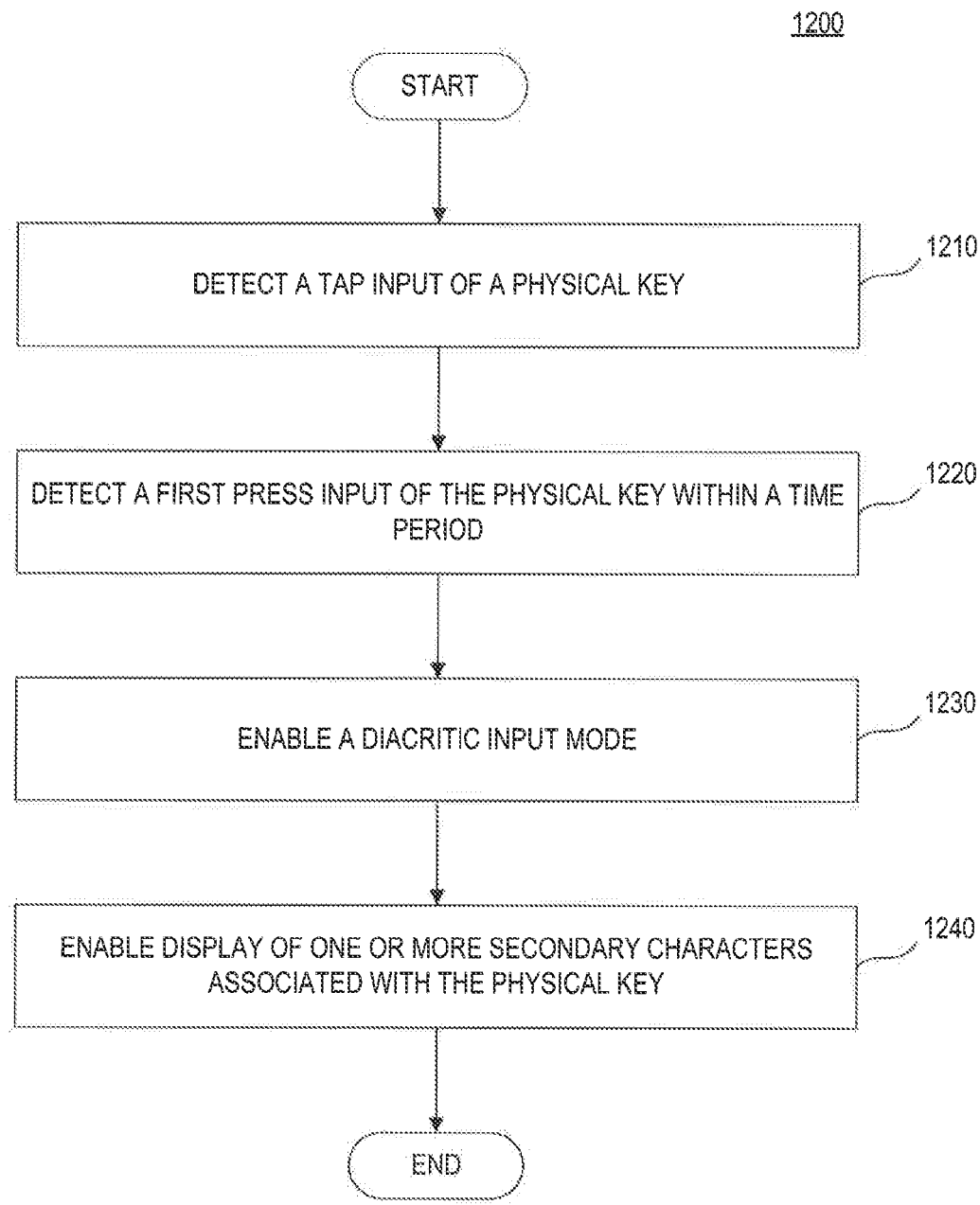
FIG. 12 shows an example of a process for rendering a secondary character in accordance with the present disclosure.

FIG. 12 shows an example of a process 1200 for rendering a secondary character in accordance with the present disclosure. The process 1200 relates to the operations discussed above in connection with the example shown in FIG. 11. It is understood that the process 1200 may be performed in any order, including, but not limited to, the order of steps shown in FIG. 12. Additional or intervening steps may also be performed.

In the example process 1200 shown in FIG. 12, the processor 200 detects a tap input of a physical key (e.g., the "E" key) (step 1210). Following the detection of the tap input, the processor 200 detects a first press input of the physical key (e.g., the "E" key) within a time period, which may be the same as or different from the first time period discussed above in connection with the example shown in FIGS. 7-9 (step 1220). Based on the detection of the first press input, the processor 200 enables a diacritic input mode (step 1230). While the diacritic input mode is enabled, the processor 200 enables display on the screen 120 of one or more secondary characters (e.g., diacritic characters) associated with the physical key (e.g., the "E" key) (step 1240). Although not shown in FIG. 12, the process 1200 may include other operations discussed above in connection with the example shown in FIG. 11. Those operations may be similar to those discussed above in connection with the examples shown in FIGS. 7-10. Details of those operations are not repeated here.

The foregoing description has been presented for purposes of illustration. It is not exhaustive and is not limited to the precise forms or examples disclosed. Modifications and adaptations will be apparent to those skilled in the art from consideration of the specification and practice of the disclosed examples. The examples shown in the figures are not mutually exclusive. Features included in one example shown in one figure may also be included in other examples shown in other figures. Additionally, although aspects of the disclosed examples are described as being stored in memory, one skilled in the art will appreciate that these aspects can also be stored on other types of transitory or non-transitory computer readable media, such as secondary storage devices, for example, hard disks, floppy disks, or CD ROM, or other forms of RAM or ROM, USB media, DVD, or other optical drive media.

The present disclosure may be embodied in other specific forms without departing from its spirit or essential characteristics. The described examples are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A portable electronic device, comprising:
a memory configured to store instructions;
a screen configured to display data;
a keyboard including a plurality of physical keys configured to receive key inputs, each of the physical keys being associated with inputting a primary character and a secondary character; and
a processor configured to execute the instructions to:
detect an input of a physical key;
determine whether the input is a press input of the physical key or a tap input of the physical key, the press input being associated with inputting the primary character, and the tap input being associated with inputting the secondary character;
enable display on the screen of the primary character associated with the physical key based on the determination that the input is the press input of the physical key; and
enable display on the screen of the secondary character associated with the physical key based on the determination that the input is the tap input of the physical key.

2. The portable electronic device of claim 1, wherein the processor is configured to execute instructions to cause the primary character or the secondary character displayed on the screen to be entered into a text editor.

3. The portable electronic device of claim 1, wherein the secondary character includes a symbol.

4. A portable electronic device, comprising:
a memory configured to store instructions;
a screen configured to display data;
a keyboard including a plurality of physical keys configured to receive key inputs, each of the physical keys being associated with inputting a primary character and one or more secondary characters; and
a processor configured to execute the instructions to:
detect a first input;
determine that the first input is a press and hold input of a physical key;
enable a diacritic input mode based on the determination that the first input is the press and hold input; and
while the diacritic input mode is enabled,
enable display on the screen the one or more secondary characters;
detect a second input,
determine that the second input is a drag input on the keyboard, and
enable display on the screen an indicator sequentially indicating selection of a secondary character among the one or more secondary characters while the drag input is detected.

5. The portable electronic device of claim 4, wherein while the diacritic input mode is enabled, the processor is further configured to execute the instructions to:
detect a release of the drag input;
enable the selected secondary character indicated by the indicator to be entered into a text editor; and
disable the diacritic input mode after the selected secondary character is entered.

6. The portable electronic device of claim 4, wherein the one or more secondary characters include at least one of a capital letter associated with the physical key and a diacritic character associated with the physical key.

7. The portable electronic device of claim 4, while the diacritic input mode is enabled, the processor is further configured to execute the instructions to:
detect a press input of the keyboard following determining that the second input is the drag input;

enable the selected secondary character indicated by the indicator to be entered into a text editor; and disable the diacritic input mode after the selected secondary character is enter.

8. A portable electronic device, comprising:
a memory configured to store instructions;
a screen configured to display data;
a keyboard including a plurality of physical keys configured to receive key inputs, each of the physical keys being associated with inputting a primary character and one or more secondary characters; and
a processor configured to execute the instructions to:
detect a press input of a physical key;
detect a first tap input of the physical key within a first time period following detection of the press input;
enable a diacritic input mode based on detection of the first tap input; and
while the diacritic input mode is enable, enable display on the screen the one or more secondary characters associated with the physical key.

9. The portable electronic device of claim 8, wherein the first tap input of the physical key is detected at the same physical key.

10. The portable electronic device of claim 8, wherein the first tap input of the physical key is detected within a tap zone associated with the physical key.

11. The portable electronic device of claim 8, wherein the tap zone is defined by keys surrounding the physical key.

12. The portable electronic device of claim 8, wherein the tap zone is defined by a circle having a radius.

13. The portable electronic device of claim 8, wherein the press input is a short press or a long press.

14. The portable electronic device of claim 8, wherein the processor is also configured to execute the instructions to:
while the one or more secondary characters are displayed on the screen, display an indicator indicating selection of a secondary character among the one or more secondary characters.

15. The portable electronic device of claim 14, wherein the processor is also configured to execute the instructions to:
detect one or more subsequent tap inputs of the physical key within a second time period following detection of the first tap input; and
enable display on the screen the indicator to cyclically indicate selection of a secondary character among the one or more secondary characters based on detection of the one or more subsequent tap inputs.

16. The portable electronic device of claim 15, wherein the processor is also configured to execute the instructions to:
determine that a third time period has elapsed following the detection of the one or more subsequent tap inputs; and
cause the selected secondary character to be entered in a text editor after the third time period has elapsed.

17. The portable electronic device of claim 14,
wherein the physical key is a first physical key, and
wherein the processor is also configured to execute the instructions to:
while the diacritic input mode is enabled and the one or more secondary characters are displayed on the screen with the indicator indicating selection of the secondary character, detect a press input of a second physical key; and
cause the selected secondary character to be entered in a text editor based on detection of the press input of the second physical key.

18. A portable electronic device, comprising:
a memory configured to store instructions;
a screen configured to display data;
a keyboard including a plurality of physical keys configured to receive key inputs, each of the physical keys being associated with inputting a primary character and one or more secondary characters; and
a processor configured to execute the instructions to:
detect a tap input of a physical key;
detect a first press input of the physical key within a first time period following detection of the tap input;
enable a diacritic input mode based on detection of the first press input; and
while the diacritic input mode is enable, enable display on the screen the one or more secondary characters associated with the physical key.

19. The portable electronic device claim 18, wherein the processor is also configured to execute the instructions to:
detect one or more subsequent press inputs of the physical key within a second time period following detection of the first tap input; and
enable display on the screen the indicator to cyclically indicate selection of a secondary character among the one or more secondary characters based on detection of the one or more subsequent tap inputs.

* * * * *

UNITED STATES PATENT AND TRADEMARK OFFICE
CERTIFICATE OF CORRECTION

PATENT NO. : 9,563,358 B2
APPLICATION NO. : 14/319297
DATED : February 7, 2017
INVENTOR(S) : Jerome Pasquero and Donald Somerset McCulloch Mckenzie Page 1 of 1

It is certified that error appears in the above-identified patent and that said Letters Patent is hereby corrected as shown below:

In the Claims

Column 16, Line 39, In Claim 19, after "device" insert -- of --.

Signed and Sealed this
Nineteenth Day of November, 2019

Andrei Iancu
*Director of the United States Patent and Trademark Office*